Patented July 2, 1929.

1,718,936

UNITED STATES PATENT OFFICE.

WALTER B. ALLEN, OF WORCESTER, MASSACHUSETTS, ASSIGNOR TO CRAFTEX COMPANY, OF BOSTON, MASSACHUSETTS.

WALL FINISH.

No Drawing.     Application filed April 7, 1924. Serial No. 704,886.

This invention relates to improvements in the method or process of applying a covering or finish to walls or similar structures and to an improved composition or preparation for use in the carrying out of the improved process.

Prior to the present invention many so-called "cold water" paints or compositions have been employed either as a thin coating or covering for walls and similar surfaces, or in a thicker coating on top of or in place of plaster or the like to provide both body and ornamental appearance to the wall surface. A number of these preparations, as for example, that disclosed in my Patent 1,477,096 of December 11, 1923 include in their composition a casein or similar binder. While these are satisfactory for inside protected work, under some conditions as when used for outside work or unduly exposed to moisture they are not entirely satisfactory as not being moisture-proof.

It is therefore one of the purposes of the present invention to apply compositions of this character in a novel manner which shall render the same much more water-proof and resistant to the action of the elements than is now the case.

A further purpose of the invention is to provide for the waterproofing of surfaces which have been previously painted or coated and at the same time to enhance the appearance thereof.

In the attainment of these objects, the invention broadly contemplates the application to a surfacing material of the type set forth in my patent above identified, for example, of an additional material in liquid form which will re-act on the several ingredients of the initial coating in a manner to cause the resultant product or composition to be water-resistant and water-repellent.

In another aspect, the invention contemplates the production of a finished wall surface by building up said surface with a compound containing inert matter having absorbent properties and subsequently applying to the built-up surface a liquid emulsion or preparation which will permeate said matter and render it non-absorbent.

The following is one example of the manner of carrying out the present invention. I first produce a suitable mixture or compound for wall coating purposes including an absorbent base or body or mass of kaolin, clay or like material and a binder of casein rendered soluble in water by the admixture of a small percentage of borax, ammonia, or the like. The mass may consist of a single material or a plurality of materials as by the inclusion of mica or the like, as set forth in the patent previously referred to. A very satisfactory proportion has been found to consists of about 5 parts of the mass to one of the casein and its solvent. This compound, for use, is dissolved by the addition of water, either warm or cold as preferred, the use of warm water facilitating reduction of the solution to the proper creamy consistency and the proper dissolving of the casein.

When dissolved, the solution is applied as a paint or in a pasty condition to the surface to be covered or protected thereby and allowed to set or dry.

A second solution is then prepared from a suitable waterproofing ingredient, preferably a vegetable wax, such as Chinese vegetable wax of japan wax. This wax is reduced or saponified by any suitable reducing agent as by the addition of lye, to produce a creamy mass which will dissolve or form an emulsion upon the addition of water. To this saponified mass may be added a small percentage of formaldehyde or like substance which will combine with and react upon casein to increase the hardness and water-resisting properties thereof.

In the completion of my improved process sufficient water is added to the saponified mass to reduce it to a milky consistence, the proportions being preferably about 10 per cent of the mass to 90 per cent of hot water, the hot water being more efficient for this purpose than cold.

This second solution having been prepared, it is applied, as by a brush, to the first coating of the wall when the fluid will soak into said finish and carry thereinto the dissolved vegetable wax, giving the entire coating, both surface and interior thereof a waxy effect, filling the interstices thereof and coating the particles of inert mass ingredients to render them thoroughly waterproof. At the same time a smoothed effect is imparted to the surface of the wall which while preserving its former attractive appearance renders it less receptive of dirt and dust and readily washable without deleteriously affecting the base surface. A finish so treated will also tend to repel water soaking through from defective roofing or side walls, shutting out the moisture in place of absorbing it and being disentegrated thereby.

In addition, when the formaldehyde is used in the formula, there is a chemical reaction between the formaldehyde and the casein, toughening and hardening the casein into an absolutely insoluble substance and supplementing the water-proofing of the entire material.

I claim:

1. The process of finishing a wall or the like, consisting in applying thereto a paint-like solution including an absorbent base and a proteid binder and subsequently applying thereto a permeating solution containing a water-proofing ingredient absorbable by the base to render the initial coating as a whole waterproof and an ingredient reactive with the proteid binder after it has been applied to the wall to increase the hardness and water resistant properties of the same.

2. The process of finishing a wall consisting in applying thereto a plastic absorbent base and a proteid binder, allowing said material to set, and subsequently applying thereto a water-proofing filler absorbable by the base to render the initial coating as a whole water-proof and an ingredient reactive with the proteid binder after it has been applied to the wall to increase the hardness and water resistant properties of the same.

3. The process of finishing a wall consisting in applying thereto successive coatings of water-soluble compounds including a primary coating consisting of an absorbent base and a proteid binder and a subsequent water-proofing coating absorbable by the base to render the initial coating as a whole waterproof and an ingredient reactive with the proteid binder after it has been applied to the wall to increase the hardness and water resistant properties of the same.

4. The process of finishing a wall or the like consisting in applying thereto a paint like solution including mineral and proteid ingredients, allowing said solution to set, and subsequently applying to the wall a permeating solution of saponified vegetable wax which is absorbable by the original solution to render the initial coating as a whole waterproof, and an ingredient reactive with the proteid in the original solution after it has been applied to the wall to increase the hardness and water resistant properties of the same.

WALTER B. ALLEN.